US006658953B2

(12) United States Patent
Lee

(10) Patent No.: US 6,658,953 B2
(45) Date of Patent: Dec. 9, 2003

(54) REVERSE SHIFT DEVICE OF MANUAL TRANSMISSION

(75) Inventor: Sang Cheol Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/085,236

(22) Filed: Feb. 26, 2002

(65) Prior Publication Data

US 2002/0170372 A1 Nov. 21, 2002

(30) Foreign Application Priority Data

May 18, 2001 (KR) ........................................ 2001-27180

(51) Int. Cl.[7] ................................................ F16H 3/38
(52) U.S. Cl. ........................................................ 74/339
(58) Field of Search ........................................... 74/339

(56) References Cited

U.S. PATENT DOCUMENTS 3,745,847 A * 7/1973 Worner et al. ................ 74/339
4,263,815 A * 4/1981 Ashauer ...................... 74/339
4,271,724 A 6/1981 Morscheck
4,294,338 A * 10/1981 Simmons ..................... 74/339
4,800,769 A 1/1989 Rietsch
5,445,253 A * 8/1995 Reyes ......................... 74/339
5,711,186 A 1/1998 Lee
5,722,291 A 3/1998 Fraley et al.
5,934,142 A 8/1999 Wagoner
5,946,970 A 9/1999 Fraley et al.
5,966,998 A 10/1999 Hara et al.
6,109,128 A 8/2000 Mazet
6,244,404 B1 * 6/2001 Kim ............................ 74/339

FOREIGN PATENT DOCUMENTS

EP 0083747 10/1982
WO WO99/23400 10/1998

* cited by examiner

*Primary Examiner*—Dirk Wright
(74) *Attorney, Agent, or Firm*—Pennie & Edmonds LLP

(57) ABSTRACT

A reverse shift device of a manual transmission is disclosed to reduce the total length of the transmission, improve shift feeling and decrease noise by excluding a reverse idler gear that rotates, while being meshed between input and output axles, the device comprising: an idle axle fixed at a shift case; and an idle synchronizer installed at the idle axle for switching a state of conveying the rotational force of an input axle to an output axle at the time of forward-reverse shifts.

9 Claims, 4 Drawing Sheets

8
5
2
13
1
9
19
14
3
4
10
11
7
12
6

REVERSE SHIFT DEVICE OF MANUAL TRANSMISSION

FIELD OF THE INVENTION

The present invention relates to a manual transmission of a vehicle and more particularly to a reverse shift device that can prevent deterioration of reverse shift feeling and reduce noise.

BACKGROUND OF THE INVENTION

As shown in FIGS. 1 and 2, there are general ways to perform a reverse shift in a manual transmission. According to a method shown in FIG. 1, the reverse shift can be achieved by meshing reverse idle gears (not shown) between the reverse drive gear 102 provided in an input axle 100 and a reverse driven gear 106 provided in first and second shifting sleeves 104 of an output axle. At this time, in order to mesh the reverse idle gears, the gravitational revolution of the input axle 100 is stopped by using a synchronizer 108 to get the input axle 100 connected to a transmission case 110. However, in this method, the synchronizer 108 is applied to the input axle 100, thereby increasing frictional resistance of the input axle 100, which may deteriorate shift feeling in a forward shift.

Next, in the method shown in FIG. 2, a reverse idler gear 208 is always meshed between a reverse drive gear 202 formed at an input axle 200 and a reverse driven gear 206 installed at an output axle 204. The reverse driven gear 206 is connected by means of a bearing 210 with the output axle 204 and then, connected by a reverse synchronizer 212 with the output axle 204. Since the reverse idler gear 208 is continuously meshed between the reverse drive gear 202 and the reverse driven gear 206, the structure shown in FIG. 2 may easily cause rattle noise when a vehicle stops or while the vehicle runs.

Also, the reverse shift devices shown in FIGS. 1 and 2, respectively, include the synchronizers 108, 212 at the input and output axles 100, 204, to thereby make the transmission longer and reduce the carry capability of a vehicle.

SUMMARY OF THE INVENTION

It is one object of the present invention to solve the aforementioned problems and provide a reverse shift device of a manual transmission that can, among other things, reduce the total length of the transmission, improve shift feeling and decrease noise.

Thus, according to a preferred embodiment of the present invention, there is provided a reverse shift of a manual transmission including an idle axle fixed at a transmission case and an idle synchronizer installed at the idle axle for switching the state of transmission of rotational force of an input axle to an output axle at the time of forward-reverse shifts. According to a further preferred embodiment a synchronizer is provided within the idle axle to reduce length.

In an alternative preferred embodiment an idle synchronizer may include an idler clutch gear installed at the idle axle for free rotation, an input gear mounted at the input axle to be meshed to the idler clutch gear, a reverse synchronizer ring installed at the idle axle beside the idler clutch gear, and an idler sleeve spline-coupled with the idle axle to be movable to the axial direction.

Further, an idler gear rotatively installed at the idler sleeve to switch between simultaneously meshing with the reverse drive gear of the input axle and the reverse driven gear of the output axle according to the axial movement of the idler sleeve. Preferably a synchro-ring operating means pushes the reverse synchronizer ring tightly to the idler clutch gear when the idler sleeve moves to the direction of enabling the idler gear to be meshed with the reverse drive gear and the reverse driven gear.

In a further alternative embodiment, a reverse shift device according to the invention includes an idler gear assembly movable between an idle position and a reverse engaged position in response to a gear shift, a reverse drive gear mounted on an input shaft cooperating with the idler gear assembly in the reverse engaged position, and a synchronizer assembly operatively linked to the idler gear assembly and cooperating with the input shaft to stop rotation of the input shaft in response to movement of the idler gear assembly to the reverse engaged position. Preferably, the idler gear assembly is made up of an idler sleeve moveable between the idle position and the reverse engaged position and an idler gear rotatably mounted on the idler sleeve, wherein the idler gear engages the reverse drive gear and a reverse driven gear in the reverse engaged position. In a further preferred embodiment, the synchronizer assembly comprises a second idler gear cooperatively engaging the input shaft, a synchronizing ring disposed adjacent the second idler gear to act thereon and a linkage between said idler sleeve and the synchronizing ring to force the ring against the second idler gear in response to movement of the idler sleeve to the reverse engaged position. Thus, the synchronizing ring acts on the second idler gear to stop rotation of the input shaft. Preferably the linkage may comprise a pivot lever having an end captured by the idler sleeve and an opposite end bearing against the synchronizing ring.

BRIEF DESCRIPTION OF THE DRAWINGS

Objects and aspects of the invention will become apparent from the following description of preferred embodiments with reference to the accompanying drawings in which.

DETAILED DESCRIPTION OF THE INVENTION

Preferred embodiments of the present invention will be described with reference to accompanying drawings.

Figure 1:
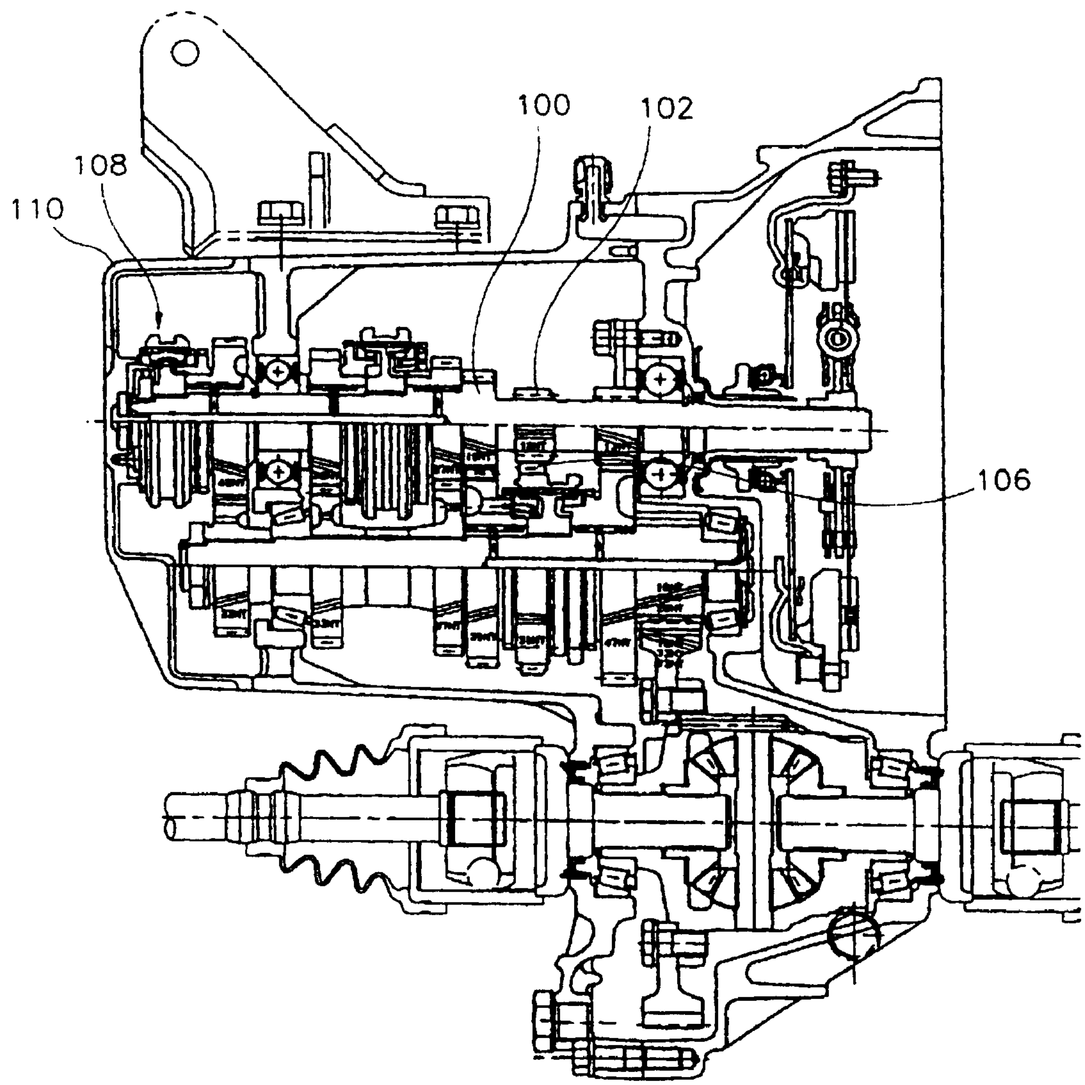
FIGS. 1 and 2 are internal structural views of a conventional prior art manual transmission.
Figure 2:
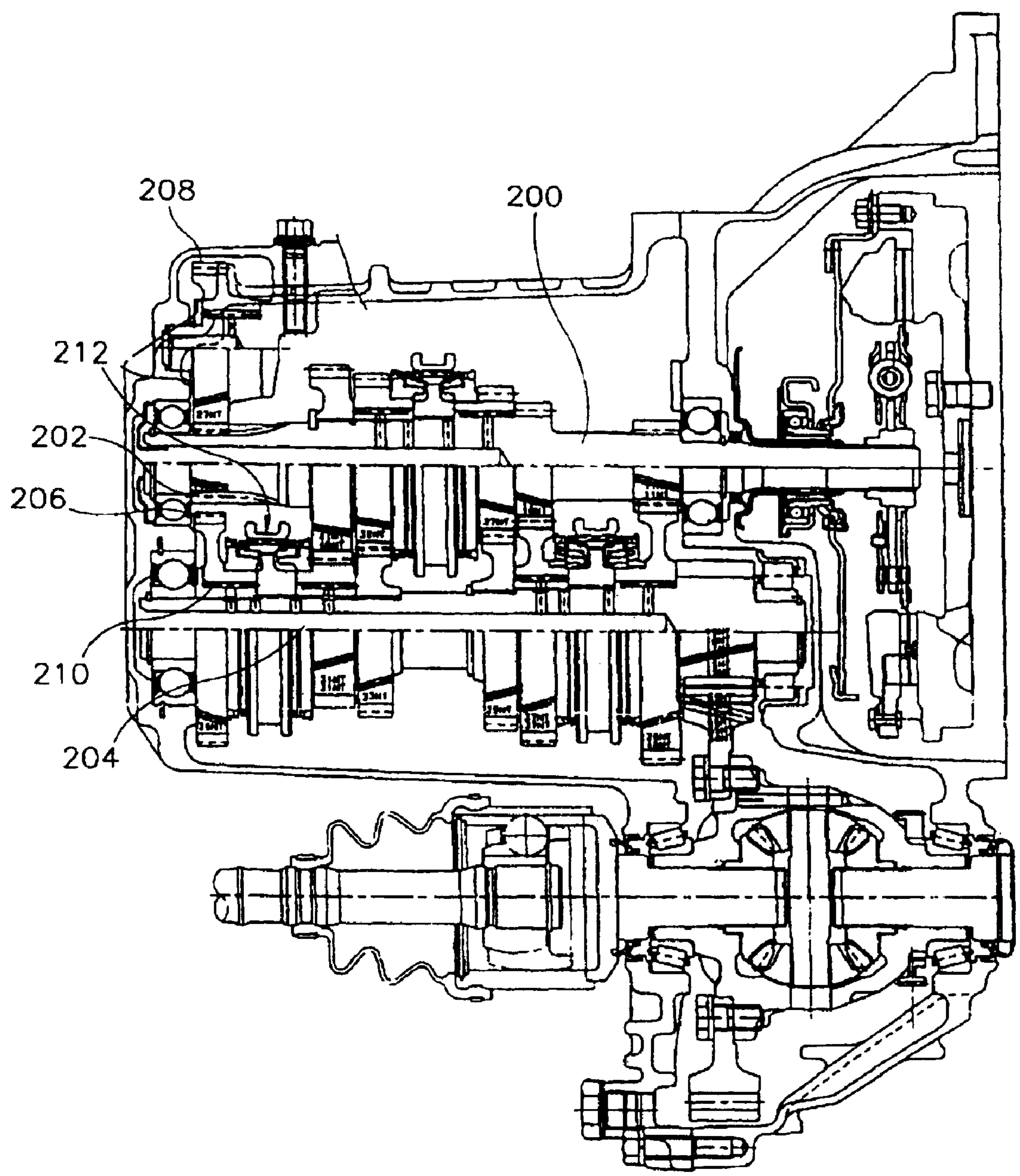
Figure 3:
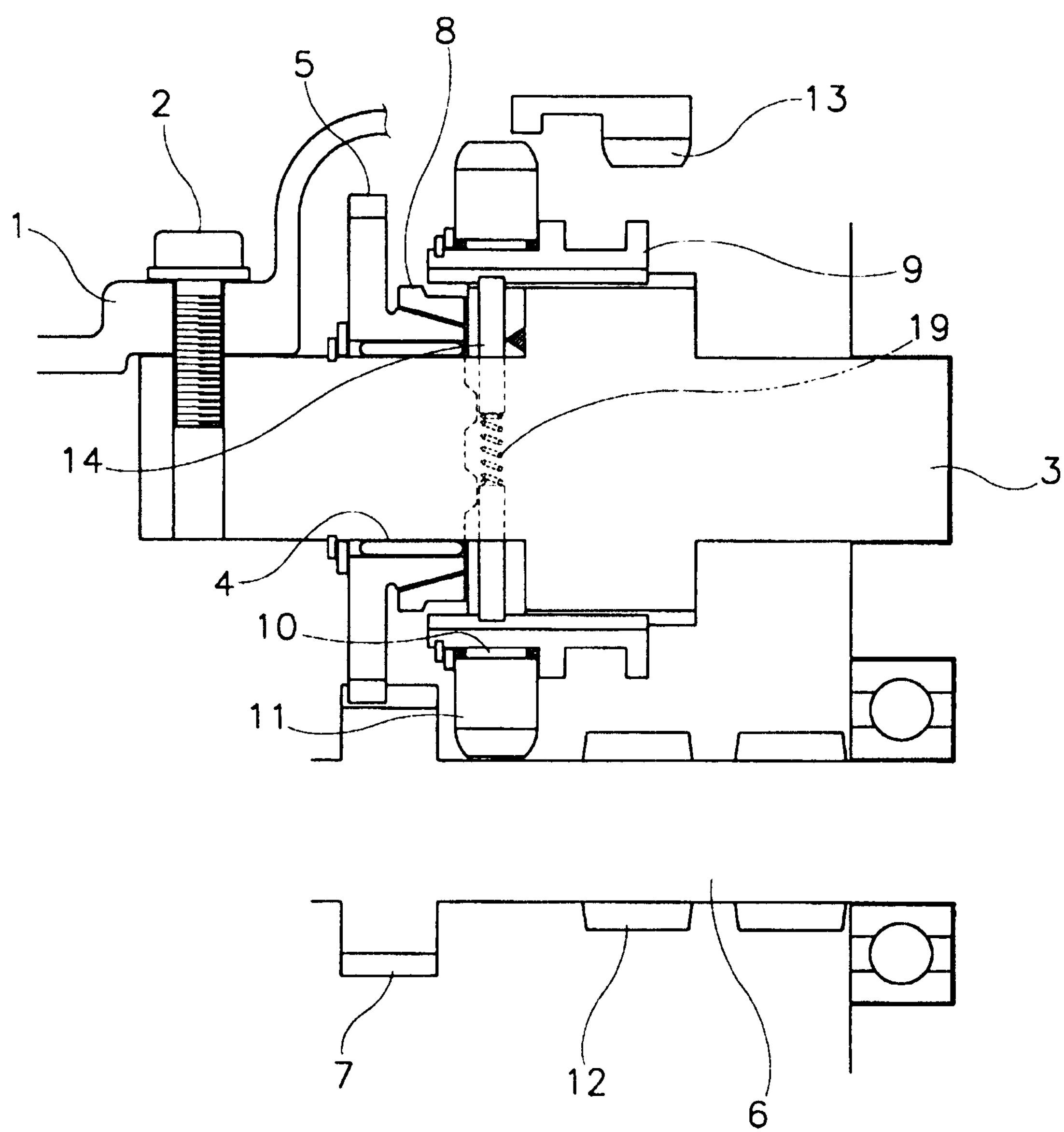
FIG. 3 is a schematic section view of a reverse shift device of a manual transmission in accordance with the present invention.

FIG. 3 illustrates a reverse shift device for a manual transmission in accordance with an embodiment of the present invention. An idler clutch gear 5 is rotatively installed with a bearing 4 at an idle axle 3 fixed by a bolt 2 at a transmission case 1. Gear 5 is maintained meshed with an input axle gear 7 formed on the input axle 6. A reverse synchronizer ring 8 is closely installed a slant part formed at the right side (in the drawing) of the idler clutch gear 5. An idler sleeve 9, installed on the idler axle 3 for movement along the axial direction permitted by spline-coupling 9*a*, slides in response to the driver's manipulation of the shift lever. In addition, an idler gear 11 is installed on a bearing 10 at the external side of the idler sleeve 9, so that reverse drive gear 12 of the input axle 6 and reverse driven gear 13 of an output axle can be simultaneously switched to a meshed state by sliding idler sleeve 9 (to the right as shown in FIG. 3).

Figure 4:
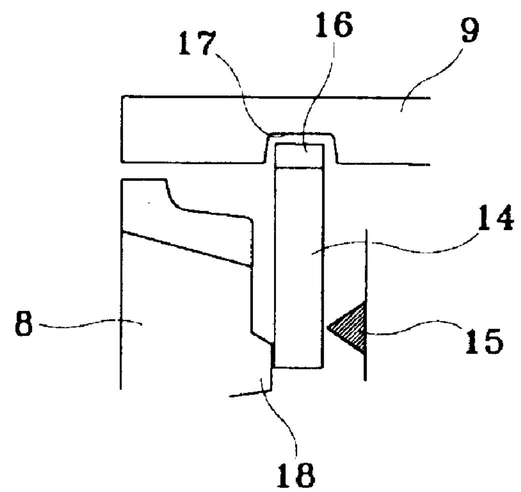
FIG. 4 is a perspective view illustrating a synchro-lever according to the invention.

A synchro-ring operating means causes reverse synchronizer ring 8 to be tightly attached to the idler clutch gear 5 when the idler sleeve 9 moves to the direction of enabling the idler gear 11 to be meshed with the reverse drive gear 12 and the reverse driven gear 13. The synchro-ring operating means, as shown in FIG. 4, includes a synchro-lever 14 resiliently supported by a spring 19 and pivotably captured at an inner side of the idler sleeve 9.

Figure 5:
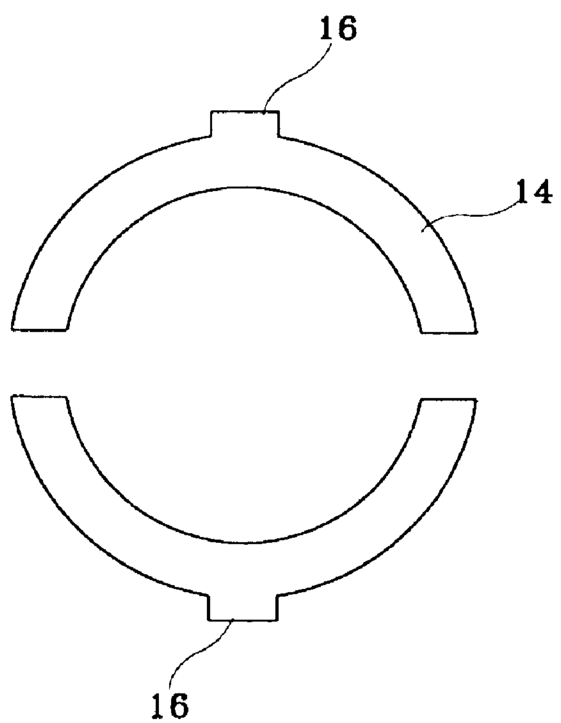
FIG. 5 is a front view of a synchro-lever shown in FIG. 3.

Pivot supporter 15 is formed on the idle axle 3, to enable the synchro-lever 14 to pivot according to the movement of the idler sleeve 9 and thus act on reverse synchronizer ring 8 to force it against idler clutch gear 5. The synchro-lever 14 can be formed as shown in FIG. 5 so that a hinge protruder 16 formed on the semicircular external side of the synchro-lever is captured in hinge groove 17 formed at the internal side of the idler sleeve 9 by resilience of the spring 19. Reverse synchronizer ring 8 also preferably has a lever contacting boss 18 positioned to cooperate with synchro-lever 14 when it rotates and pushes against reverse synchronizer ring 8. As a result, the reverse synchronizer ring 8 can be closely contacted to the idler clutch gear 5 by pivot movement of the synchro-lever 14.

Operations of a preferred embodiment of the present invention thus constructed will be described below.

Except in case of the reverse shift, a manual transmission is maintained at the state as shown in FIG. 3. In other words, the idler clutch gear 5 is idling meshed with the input axle gear 7 of the input axle 6 without affecting the shift manipulation or shift status of other forward shifts via the input axle 6 so that the input axle 6 can be freely rotated.

If the reverse shift manipulation is made at the aforementioned state, the idler sleeve 9 begins its straight movement to the right (as shown in FIG. 3). At this time, the synchro lever 14 pivot-connected to the internal hinge groove 17 of the idler sleeve 9 rotates about pivot supporter 15 and acts on the lever contacting boss 18 of the reverse synchronizer ring 8. Therefore, the angled surface of the reverse synchronizer ring 8 is forced into contact with the idler clutch gear 5, which are synchronized to stop revolution of the idler clutch gear 5, and, thus, stops rotation of the input axle 6 with the input axle gear 7 connected thereto. Subsequently, when the idler sleeve 9 is further moved to the right, synchro-lever 14 compresses spring 19 and by pushing against idler axle 3 is disengaged from the idler sleeve 9. In this state the lever rotates about pivot supporter 15 to return to its original position, and pressure applied to the lever contacting boss at the reverse synchronizer ring 8 is released, thereby releasing the contact between the reverse synchronizer ring 8 and the idler clutch gear 5. As the idler sleeve 9 is moved further to the right, the idler gear 11 is meshed with the reverse drive gear 12 of the input axle 6 in the stopped state and the reverse driven gear 13 of the output axle, thereby completing the shifting operations to the reverse shift.

When the driver takes his foot off the clutch pedal, rotational force provided for the input axle 6 is transmitted to the output axle by reversing its rotational direction through the idler gear 11. Because the idler gear 11 is installed on the sleeve 9 by means of bearing 10, no rotational force is transmitted to the idler axle 3 itself.

If the driver manipulates the shift lever to release the reverse shift, the idler sleeve 9 moves to the left to take the idler gear 11 off from the reverse drive gear 12 and reverse driven gear 13. Also, hinged protruder 16 on the end of synchro-lever 14 is re-inserted into hinge groove 17 of the idler sleeve 9 by the spring 19 to return to a state shown in FIG. 3.

As described above, some of the advantages in the present invention are that a synchronizing unit to stop rotation of an input axle is installed at the idle axle to reduce the total length of the transmission, that a synchronizing unit connecting the transmission and the input axle is not selected to reduce the frictional resistance of the input axle and improve the shift feeling and that a reverse idler gear, which in the prior art was always being meshed between the input and output axles, is excluded to reduce rattling noise.

What is claimed is:

1. A reverse shift device for a manual transmission comprising:

an idle axle fixed to a transmission case; and an idle synchronizer installed on the idle axle for switching a state of transmitting the rotational force of an input axle to an output axle during forward-reverse shifts wherein said idle synchronizer comprises;

an idler clutch gear installed on the idle axle for free rotation therearound;

an input gear mounted on the input axle to be meshed to the idler clutch gear;

a reverse synchronizer ring installed at the idle axle beside the idler clutch gear;

an idler sleeve spline-coupled with the idle axle to be movable along the axial direction;

an idler gear rotatively installed at the idler sleeve for switching the state of being simultaneously meshed with the reverse drive gear of the input axle and the reverse driven gear of the output axle according to the axial movement of the idler sleeve; and a synchro-ring operating means for closely contacting the reverse synchronizer ring to the idler clutch gear when the idler sleeve moves to the direction of enabling the idler gear to be meshed with the reverse drive gear and the reverse driven gear.

2. The device, as defined in claim 1, wherein the synchro-ring operating means comprises a synchro-lever resiliently supported by a spring and pivoted at an inner side of the idler sleeve and a pivot supporter formed at the idle axle to enable the synchro-lever to rotate according to the movement of the idler sleeve and to closely contact the reverse synchronizer ring to the idler clutch gear.

3. The device, as defined in claim 2, wherein a lever contact protruder is installed at a part of the reverse synchronizer ring where the synchro-lever rotates and pushes.

4. The device as defined in claim 1, wherein the state of transmitting is either transmitting rotational force or not transmitting rotational force.

5. A reverse shift device for a manual transmission, comprising:

idler gear assembly movable between an idle position and a reverse engaged position in response to a gear shift;

a reverse drive gear mounted on an input shaft cooperating with the idler gear assembly in the reverse engaged position; and a synchronizer assembly operatively linked to said idler gear assembly and cooperating with the input shaft to stop rotation of the input shaft in response to movement of the idler gear assembly to the reverse engaged position;

wherein said idle gear assembly comprises an idler sleeve moveable between the idle position and the reverse engaged position; and an idler gear rotatably mounted on the idler sleeve, wherein the idler gear engages the reverse drive gear and a reverse driven gear in the reverse engaged position.

6. The reverse shift device according to claim 5, wherein the synchronizer assembly comprises:

a second idler gear cooperatively engaging the input shaft;

a synchronizing ring disposed adjacent the second idler gear to act thereon;

a linkage between said idler sleeve and said synchronizing ring to force said ring against the second idler gear in response to movement of said sleeve to the reverse engaged position, said ring acting on the second idler gear to stop rotation of the input shaft.

7. The reverse shift device according to claim 6, wherein said linkage comprises a pivot lever having an end captured by the idler sleeve and an opposite end bearing against the synchronizing ring.

8. A reverse shift device for transferring reverse power from a reverse drive gear mounted on an input axle to a reverse driven gear in a manual transmission, comprising:

a fixed idle axle;

an idler clutch gear rotatably mounted on the idle axle;

an input gear mounted on the input axle and meshing with the idler clutch gear;

a reverse synchronizer ring mounted on the idle axle adjacent the idler clutch gear;

an idler sleeve mounted on the fixed idle axle for translation between unengaged and reverse engaged positions;

an idler gear rotatably mounted on the idler sleeve to mesh between the reverse drive gear and reverse driven gear in the engaged position;

means for synchronizing reverse drive gear and the idler gear when moved to the reverse engaged position.

9. The reverse shift device according to claim 8, wherein the means for synchronizing comprises a lever having one end cooperating with the idler sleeve and an opposite end acting on the reverse synchronizing ring such that movement of the idler sleeve to the reverse engaged position forces the synchronizing ring to against the idler clutch gear to brake rotation thereof.

* * * * *